Dec. 20, 1927.
H. SANDNER
1,653,590
ADJUSTABLE DAMPER WIRE CONNECTION FOR GRAND PIANO ACTIONS
Filed March 16, 1926
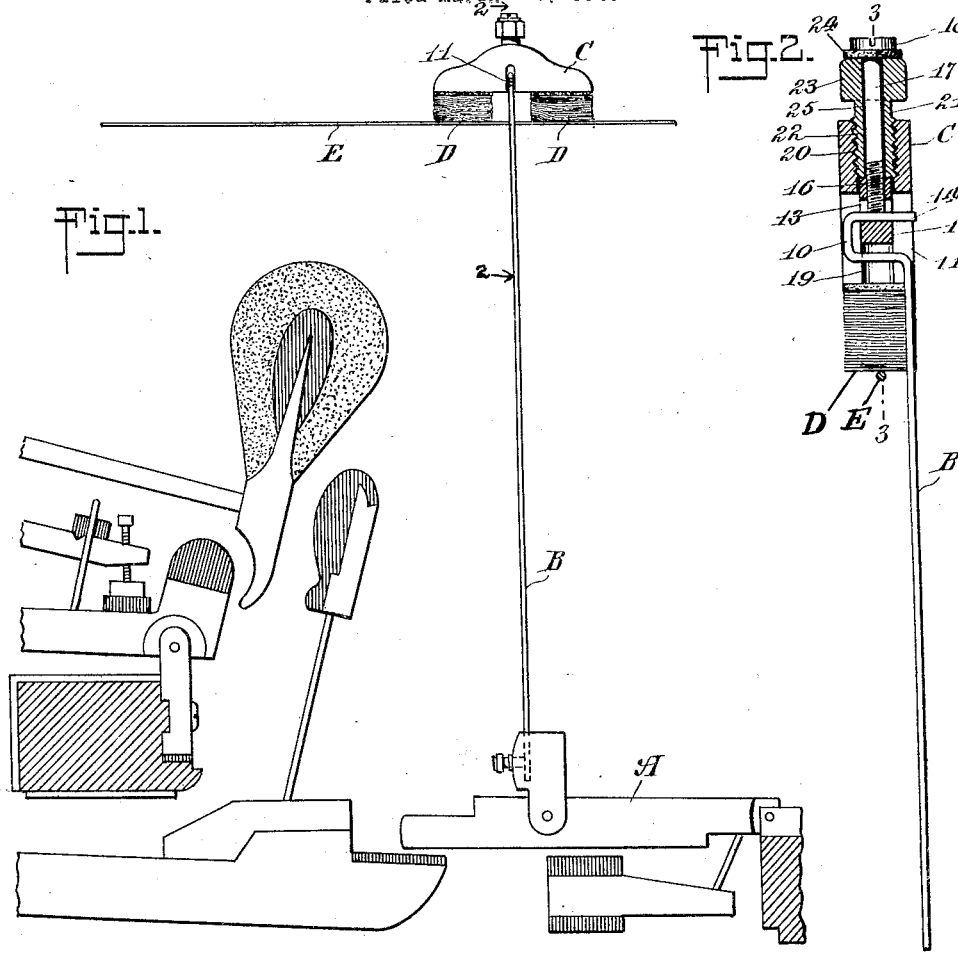
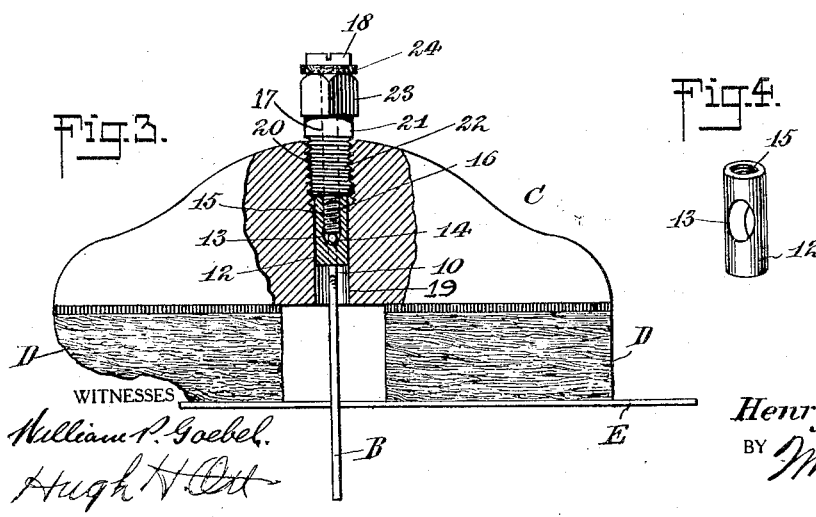
WITNESSES
William P. Goebel.
Hugh H. Ott
INVENTOR
Henry Sandner
BY
ATTORNEYS Patented Dec. 20, 1927.

1,653,590

UNITED STATES PATENT OFFICE.

HENRY SANDNER, OF UNION CITY, NEW JERSEY, ASSIGNOR OF ONE-HALF TO JULIUS ASCHINGER, OF UNION CITY, NEW JERSEY.

ADJUSTABLE DAMPER-WIRE CONNECTION FOR GRAND-PIANO ACTIONS.

Application filed March 16, 1926. Serial No. 95,071.

This invention relates to piano actions and has particular reference to an improvement in the damper structure of grand piano actions.

Heretofore the operation of adjusting the dampers of piano actions, owing to the fact that the adjusting means has been located at the lower end of the damper wire or rod adjacent its connection with the damper lever, has practically necessitated the removal of the action from the piano to accomplish proper adjustments. Furthermore, owing to the crudeness of the adjusting means it has been necessary to resort to the bending of the damper wires or rods for obtaining precision in the adjustment.

It is therefore primarily the outstanding object of the present invention to arrange the damper adjusting means in the damper head proper so that the adjustments can be readily made without removing the action from the piano.

The invention further comprehends an adjustable connection between the damper heads and damper wires or rods, which admits of more precise adjustments; which allows for the removal of the head from the wire without disruption of the action; which allows for lateral adjustment of the head with respect to the wire without bending of the same, and in which a connection is provided which precludes turning or canting of the head with respect to the strings or wires.

The invention furthermore contemplates an adjustable damper wire connection which is comparatively simple in its construction, inexpensive to manufacture, and which is highly efficient in its purpose.

With the above recited and other objects in view, reference is had to the following specification and accompanying drawings, in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a fragmentary side view of an action equipped with a damper and a damper wire having an adjustable means of connection in accordance with the invention;

Fig. 2 is a sectional view therethrough taken approximately on the line 2—2 of Fig. 1;

Fig. 3 is a sectional view taken approximately on the line 3—3 of Fig. 2;

Fig. 4 is a detail perspective view of the clamping sleeve.

Referring to the drawings by characters of reference A designates the damper lever to which the damper wire B is connected at its lower end, and C the damper head to which the damper wire is connected at its upper end.

The connection between the damper head and the damper wire, which constitutes the subject matter of the present invention, consists in forming or providing the upper end of the damper wire B with a laterally offset hooked terminal 10 and forming the damper head C with a transverse slot 11 extending from its lower edge to a point approximately at the center of said head of a size to snugly receive the hooked terminal 10 of the wire B.

The invention further comprehends a means carried by the damper head for effecting relative vertical and lateral adjustments of the terminal 10 of the wire and the damper head, which means includes a clamping sleeve 12 having a transverse elongated opening 13 designed to receive the free extremity 14 of the hooked terminal. The clamping sleeve is formed with an internally threaded axial bore 15 in its upper end which communicates with the transverse opening 13 to allow for the threading therethrough of the threaded terminal 16 of a shank 17, which shank is formed at its upper end with an enlarged kerfed head 18. The damper head C is provided with a vertical bore 19 intersected by the slot 11 and extending upwardly beyond the slot where it is formed with an enlarged threaded portion 20 disposed wholly within the unslotted upper portion of the damper head, the lower reduced unthreaded portion being of a diameter to snugly receive the clamping sleeve 12. A tubular stem 21 having a threaded lower portion 22 is threadedly received in the enlarged threaded portion 20 of the damper head bore and it should here be noted that the thread of the shank 17 and the thread of the stem 21 are oppositely pitched for a purpose to be hereafter set forth. The upper end of the tubular stem is formed with an enlarged multifaced head 23 of greater diameter than the kerfed head 18, and between which heads a washer 24 is interposed. The shank 17 is designed to extend through the bore 25 of the stem so that in effect the stem 21 and its head are swiveled to the clamping sleeve by means of the shank 17.

In use and operation it is obvious from the foregoing construction that when the damper head C and damper wire B are assembled by means of the connection, turning movement of the tubular stem 21 will cause the threaded portion 22 engaging in the threaded bore 20 of the damper head, to effect relative vertical movements or adjustments of the head and stem, thereby, due to the connection of the lower end of the wire B with the damper C, in effect causing the damper pads D to exert varying pressures on the string E. At the same time, it is obvious that by loosening the threaded terminal 16 of the shank which clamps the free terminal 14 of the hooked portion 10 against the lower end of the transverse opening 13, lateral adjustments of the damper head with respect to the wire may be obtained, after which the threaded terminal may be manipulated to again clamp the extremity 14. By making the threaded portions 16 and 22 of opposite pitches, it is obvious that when turning the stem 21 to effect a vertical adjustment, the unthreading of the shank 17 is prevented.

From the foregoing it will be obvious that in addition to positioning the adjustable connection at a point which eliminates the necessity of removing the action from the piano when adjustments are required, the device permits of the removal, replacement, or renewal of the damper heads readily, while positive and accurate adjustments both lateral and vertical may be accomplished in a minimum of time and with a minimum amount of labor.

What is claimed is:

1. A damper construction for grand piano actions, including a damper wire, a damper head, and means of connection therebetween including a laterally disposed terminal at the upper end of the damper wire, a clamping element engaging said terminal, the damper head carried by the clamping element for vertical adjustments thereon and the clamping element constituting means for allowing lateral adjustments of the damper head with respect to the damper head from said damper wire.

2. A detachable and adjustable means of connection between a damper head and damper wire, comprising a laterally offset hooked terminal at the upper end of the damper wire, a transversely slotted lower portion of the damper head, means for detachably clamping the hooked end of this damper wire in the slot of the head, and means for vertically adjusting the head after the damper wire has been secured thereto.

3. A connection between a damper head and damper wire, comprising a laterally offset hooked terminal at the upper end of the damper wire, a transversely slotted lower portion of the damper head receiving the hooked terminal of the damper wire, a clamping sleeve having a lateral opening, the damper head having a vertical bore at the lower relatively reduced portion of which intersects the slotted portion and receives the clamping sleeve, the upper portion of said bore being interiorly threaded and relatively larger than the lower portion of the bore, a threaded tubular stem arranged therein and having a manipulating portion projecting above the damper head, a threaded shank extending through the bore of the tubular stem threadedly engaging the upper end of the clamping sleeve and co-acting with the lower end of the transverse opening to clamp therebetween the offset hooked terminal of the damper wire, said shank having a kerfed upper end, the threaded portion of said shank being oppositely disposed with respect to the threaded portion of the tubular stem.

4. A connection between a damper head and damper wire, comprising a laterally and angularly disposed terminal at the upper end of the damper wire, a medial transverse slotted lower portion in the damper head for the reception of the offset damper wire terminal, a vertically adjustable element extending vertically through the upper portion of the damper head intersecting the slotted portion thereof, and detachable means associated with the adjustable element for securing the lateral angularly offset terminal of the damper wire, whereby lateral and vertical adjustments of the damper head are obtained and disconnection of the damper wire and damper head is facilitated.

HENRY SANDNER.